United States Patent [19]
Bowers

[11] Patent Number: 4,933,514
[45] Date of Patent: Jun. 12, 1990

[54] INTERRACTIVE TEMPLATE

[76] Inventor: Harold L. Bowers, Rte. 3, Box 276, Troutville, Va. 24175

[21] Appl. No.: 315,860

[22] Filed: Feb. 27, 1989

[51] Int. Cl.$^5$ ............................................. G08C 21/00
[52] U.S. Cl. ..................................... 178/18; 340/712
[58] Field of Search ................... 178/18, 19; 340/701, 340/712, 709, 710

[56] References Cited
U.S. PATENT DOCUMENTS
4,821,029  4/1989  Logan et al. ........................... 178/18

Primary Examiner—Stafford D. Schreyer
Attorney, Agent, or Firm—Plante, Strauss, Vanderburgh

[57] ABSTRACT

There is disclosed a grouping of templates which are useful in a computer system having a central processing unit with a keyboard station and a pointing device station having a pointer which has at least one cursor button which is responsive to input the positional movement of the pointer. The invention is applicable to computers operating with systems which have successively layers of a main menu of selected and grouped functions and sub-menus in successive layers, which have selected and grouped sub-functions that are accessible by successive entries from the keyboard or the pointing device. The invention is particularly applicable to a computerized assisted drafting or manufacturing system which customarily utilizes a digitizing tablet. The templates of this invention are intended for use with the pointing device and include indicia which are arrayed in predetermined locations on the templates in a plurality of groups, each of which corresponds to a predetermined selectable item of the main menu. All members of a group share a common group identifying characteristic, such as color. The templates include at least a second plurality of indicia, each of which corresponds to a predetermined selectable item of a sub-menu. The invention also includes macro definitions with each macro corresponding to the position coordinates of its identifying indicia on the templates.

12 Claims, 7 Drawing Sheets

FIG. 3B

INTERRACTIVE TEMPLATE

BACKGROUND OF THE INVENTION

1. Field of Invention

This invention relates to templates useful for entry of data into a computer system and, in particular, to a series of templates useful with computerized assisted drafting.

2. Brief Statement of the Prior Art

Operations on mini- and micro-computers have progressively evolved to fairly complex functions providing the user with a wide selection of operating functions. As the operations have become increasingly complex, a problem which has faced equipment and software designers is the difficulty experienced by users in learning the operations sufficiently to become proficient in the tasks assigned to the computer system. User-friendly equipment and software have been developed with the major objective of providing a system which is easy to learn and use. Typical of the approaches which have been used are the menu driven or the icon driven operations. In these applications, the selection of a desired operation is achieved by following a path through a plurality of selectable levels of menus and sub-menus, also referred to as "pull-down" or hierarchial on-screen menus. Multiple levels of menus are required since the large number of ultimate working functions and the complexity of the system precludes a single visual display of all the working functions which are available. Examples of such systems include applications for desktop publishing, word processing, and computerized assisted drafting and manufacturing (CAD-CAM).

A very popular form of menu-item display is icon presentation. In this presentation, graphic symbols which correspond to the items or functions which can be selected by the user are visually displayed on the monitor of the computer. The user selects the icon with a pointing device such as a mouse or light pen. While the icon or graphic symbol presentation is credited as very user friendly, it has the disadvantage of time delays which are encountered for refreshing the monitor display as the user progresses through the various levels of selectable functions (pull down menus) to the desired final working function.

In the applications which utilize a keyboard selection of the working function, some applications include a macro capability thereby permitting the user to define a key or combination of keys which will automatically provide to the computer a signal corresponding to a key sequence, thereby providing, in a single keystroke, the path through the levels of main and sub-menus to the desired function. This application is limited however, as there is a practical limit to the number of macro definitions which can be quickly learned and retained by the user. If the user does not recall the particular key or keys which will call up the macro, it is necessary to display the macro file directory or library, thus requiring an additional step and delaying the operation. As the macros are commonly written with keyboard entries, their application is also so limited and users who are more comfortable using a pointing device must forego the accelerated speed of selection obtained by use of macros.

BRIEF STATEMENT OF THE INVENTION

This invention comprises templates which are useful in a computer system having a central processing unit with a keyboard station and a pointing device station having a pointer which has at least one cursor button which is responsive to input the positional movement of the pointer. The invention is applicable to computers operating with systems which have successively layers of a main menu of selected and grouped functions and sub-menus in successive layers, which have selected and grouped sub-functions that are accessible by successive entries from the keyboard or the point device. The template of this invention is intended for use with the pointing device and includes indica which are arrayed in predetermined locations on the template in a plurality of groups, each of which corresponds to a predetermined selectable item of the main menu. All members of a group share a common group identifying characteristic, such as color. The template includes at least a second plurality of indica, each of which corresponds to a predetermined selectable item of a sub-menu. The invention also includes macro definitions with each macro corresponding to the position coordinates of its identifying indica on the templates.

The invention is particularly applicable to a computerized assisted drafting or manufacturing system which customarily utilizes a digitizing tablet. The digitizing tablet has a working surface which is criss-crossed by a gridwork of sensing antenna positioned within the tablet and responsive to signals from the pointing device to transmit a signal to the computer which reflects the position of the cursor. In this application, the template of the invention is fixedly secured to the digitizing tablet working surface and its position thereon is calibrated to obtain the proper selection of the desired macro.

BRIEF DESCRIPTION OF THE DRAWINGS

The invention will be described with reference to the drawings of which:

Figure 3B:
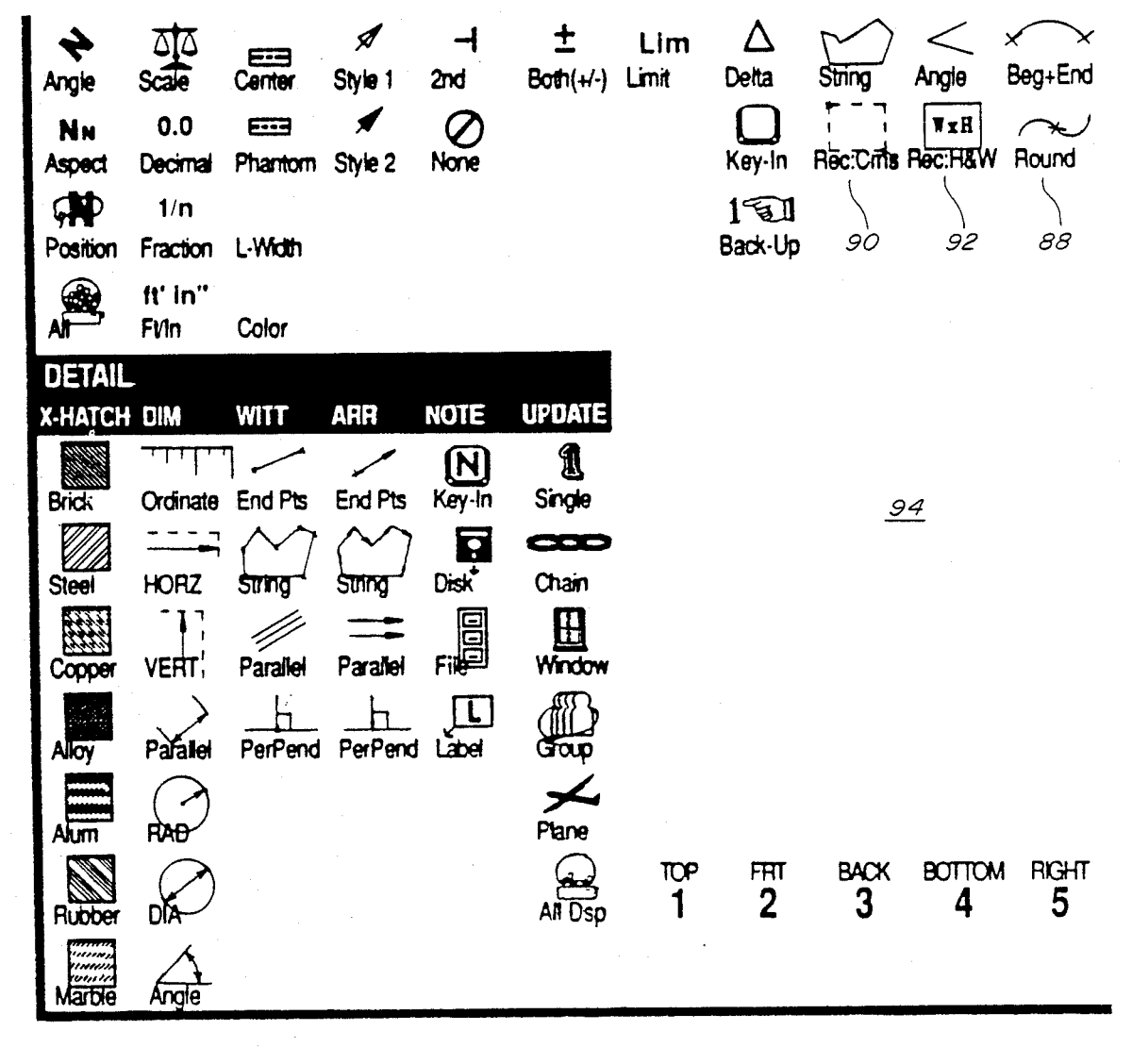

FIG. 3A through 3D illustrates the second template used in the invention; and

DESCRIPTION OF PREFERRED EMBODIMENT

Figure 1:
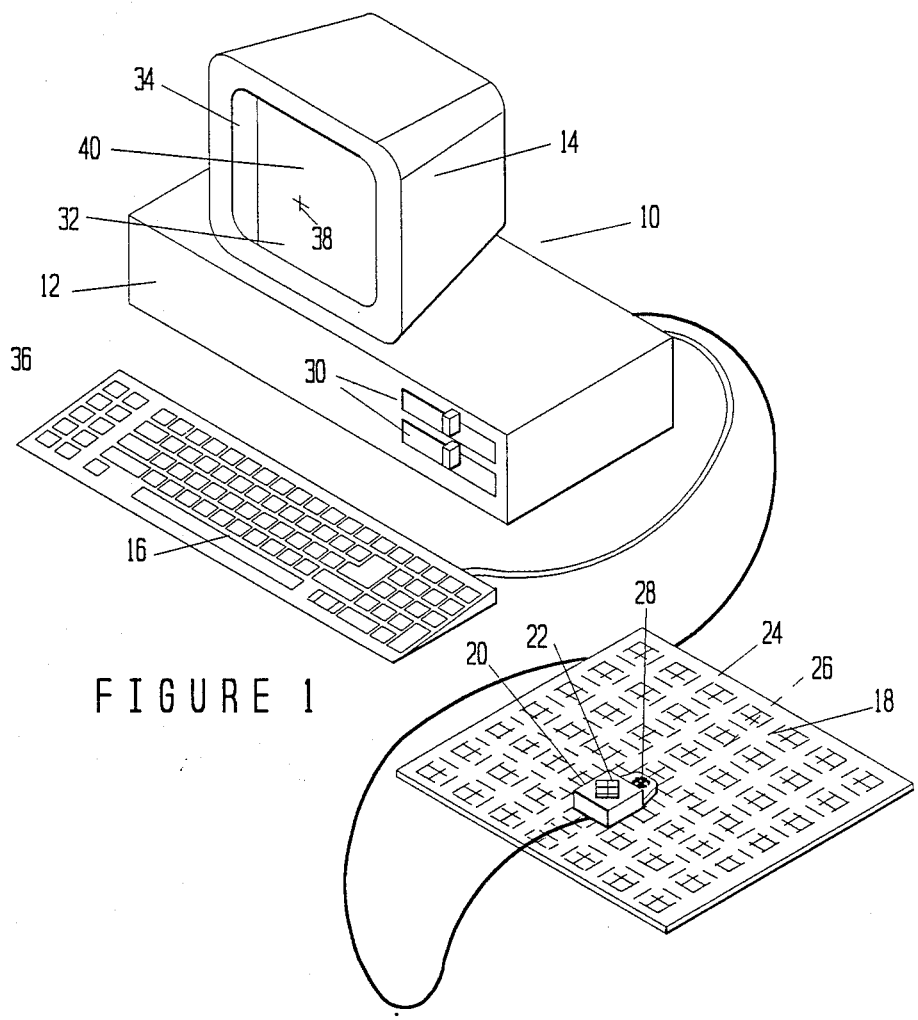
FIG. 1 illustrates a typical computer system in which the invention is used.

Referring now to FIG. 1, the invention is shown as applied to a computer system 10 comprising a microcomputer housed in a computer case 12 and having a display monitor 14 with a keyboard 16 for entry of data and a digitizing tablet 18 for entry of data selected by a pointing device 20 which has a cursor entry button 22. The computer system 10 is conventional and the peripheral units such as the monitor 14, digitizing tablet 18 and keyboard 16 are usually connected through ports located at the rear of the computer case. The digitizing tablet 18 is also conventional and has a working surface 24 that is criss-crossed by a regularly spaced grid work of sensing antenna 26 (shown in broken or dashed lines) which are incorporated within the structure of the tablet. The pointing device 20 is included in an electrical circuit and usually has a cursor or cross-hairs 28 from which an electrical signal is transmitted to the closest adjacent antenna of the grid work.

The computer is loaded with an operating system and with a system for the particular application, such as word processing, desktop publishing, or CAD/CAM.

The loading is usually performed with one or more disc drives 30 which read system instructions from discs and copy those instructions onto a fixed disc permanently installed in the computer. Alternatively, the application system can be installed in the computer with one or more ROM (read only memory) cartridges which fixedly contain the operating instructions. In either event, the computer is programed by the operating instructions for the particular application and is thereby responsive to entry of data from the keyboard 16 or the digitizing tablet 18. Signals which are generated from the receiving antenna of the digitizing table are transmitted to the computer and processed to reflect the coordinates of the points on the tablet at which the signal from the cursor button is received. This system thus provides for the transmission of position data from the digitizing tablet to the computer.

As illustrated on the display monitor 14, the operating system usually divides the monitor display screen 32 into a marginal area 34 on which is displayed the main menu and the sub-menus, as the user progresses along a path through successive levels of sub-menus. The menus are commonly selectable by the use of the function keys 36 of the keyboard or by use of the pointing device 20 to move the cursor 38 which appears on the monitor screen 32 to a location beside the desired item or function and then pressing the cursor button. The major area 40 of the monitor screen 32 is reserved for display of the work subject such as text or graphics.

Figure 2:
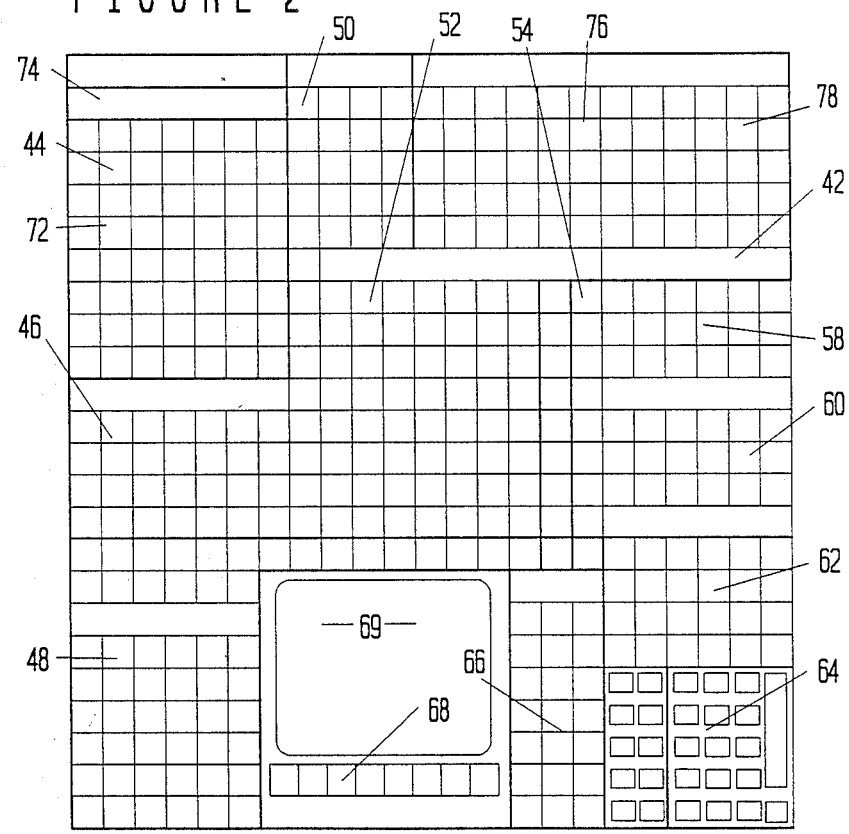
FIG. 2 illustrates one of the two templates used in the invention.
Figure 3A:
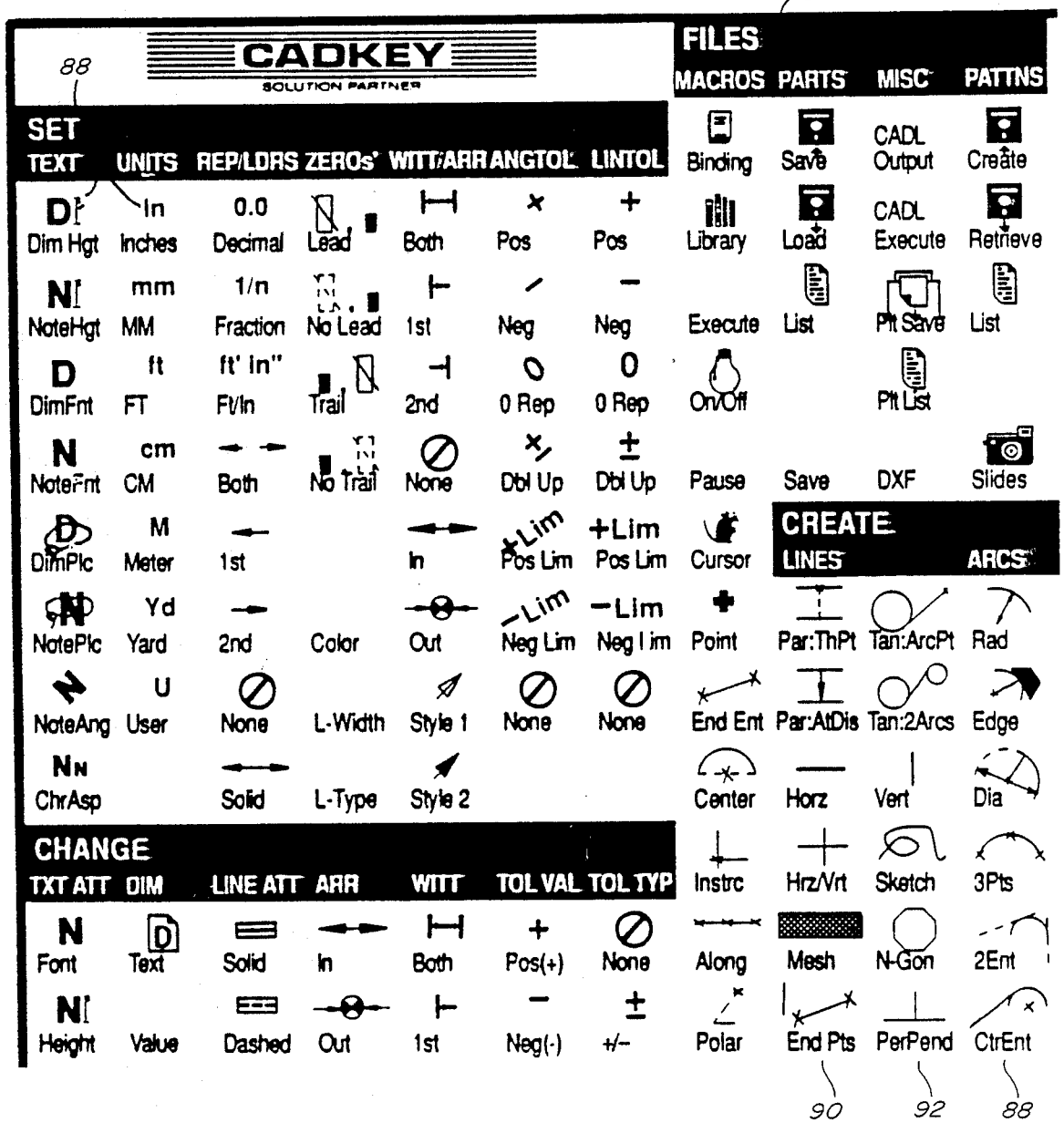
Figure 3C:
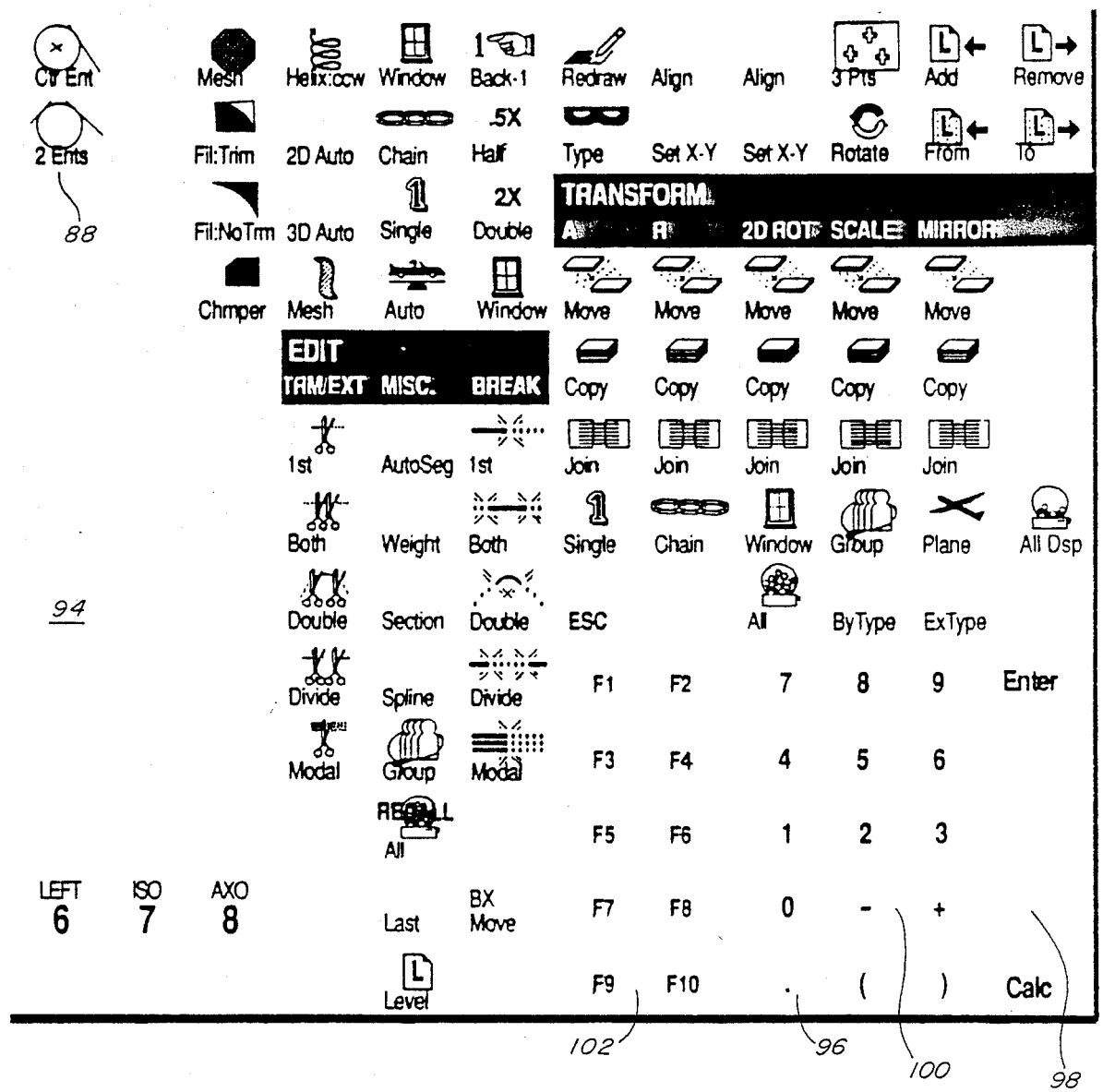
Figure 3D:
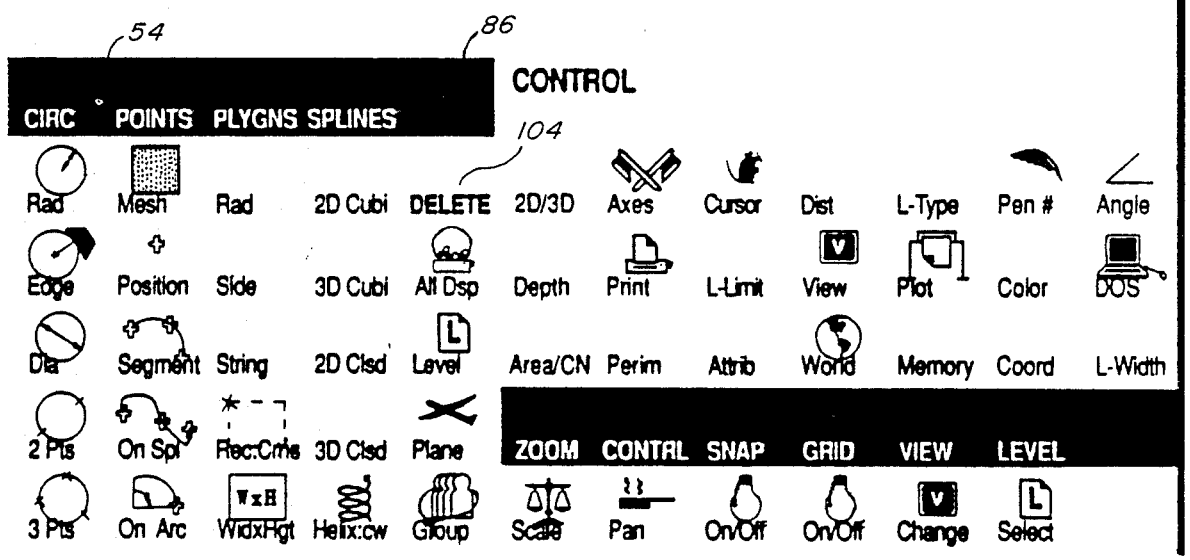

Referring now to FIG. 2, the first template 42 of the templates which are used in the invention will be described. This template 42 is divided into groups 44, 46, 48, 50, 52, 54, 56, 58, 60, 62, 64, 66 and 68 which are positioned at preselected locations on the template 42. Each group corresponds to one of the items of the main menu of the operating system. Preferably, each of these groups is subdivided into a plurality of subgroups by a lined grid, thereby forming an array of smaller rectangular blocks, such as 72. Preferably, each group has a horizontal bar, such as 74, which is not subdivided. One or more areas 76 and 78 of the first template 42 can be reserved for customized application by the user to permit the user to add additional functions which are not displayed on the main menu of the system.

Preferably, each of the groups 44–68 displayed on the first template 42 has a single characteristic indicium. For this purpose, color is eminently suited as a common indicium and each of the groups 44–68 can be of a single characteristic color such as red, pink, blue, green, orange, yellow, etc. The assignment of color as the grouping characteristic for identification of items of the main menu is preferred as the expense of the printing of colored templates is significantly greater than the printing of other indicia. As the first template corresponds to selectable items of the main menu, is a more permanent template and will not require replacement for updates of the operating system. This permits use of less expensive printing of the sub-menu items on the second, or overlying template which can be replaceable as the system is upgraded or customized by the user.

Referring now to FIG. 3A through 3D, the second template 80 used in the invention will be described. As there illustrated, the second template 80 is of clear plastic and is preferably printed on its under surface 82, thereby protecting the printed indicia 84 from loss by wear or erosion. The second template is thus a clear overlying template which has a plurality of indicia 84 of ultimate working functions. All the indica 84 are arranged in the previously mentioned groups 44–68 of the first template 42. Preferably, the upper clear plastic overlay template 80 has horizontal bars such as 86 which correspond to an item of the main menu and which are positioned to overlie the horizontal bars 74 of the first template 42. These horizontal bars 86 are printed with the items of the successive level of sub-menu thereby defining a series of columns such as 88 in each group. Each column corresponds to an item selectable from the sub-menu of the first layer. Each row 88 in the columns thus defined is defined with a selectable item of the sub-menu in the next or successive layer.

As an example, the functions which appear in group 54 correspond to the "Create" item selected from the main menu of the operating system. The sub-menu in the next successive sub-level provides selectable items comprising Lines, Arcs, Circles, Points, Polygons and Splines. Each of these functions is assigned a column 88 beneath the Create bar 86. In this example, the Lines function is assigned two columns 90 and 92. The individual items appearing in the rows in each of these columns represents an ultimate working function. Thus, the rows in column 90 include an icon of parallel lines and the abbreviation: "Par:ThPt" for the function which constructs a parallel line through a point; an icon for parallel lines with an arrow and the abbreviation: "ParAtDis", for the function which constructs a parallel line at a distance; a horizontal-line icon and an abbreviation: "Hor", for a function which constructs a horizontal line; a cross icon and the abbreviation: "Hz/Vt" for a function that draws horizontal and vertical lines; a mesh icon and the word: "Mesh" for the function which draws mesh lines; a line icon with an x at each end and the abbreviation: :"End Pts"· for the function which draws a line between selected end points; a random-sided icon and the word: "String" for the function which draws lines between a string of points; a box-icon and the abbreviation: "RecCrns", for the function which draws a rectangle between defined corners.

The rows in column 92 include a circle with a tangent line as an icon and the abbreviation: "Tan:ArcPt" for the function which draws a line which is tangent to an arc and through a point; two circles with a tangent line as an icon and the abbreviation: "Tan2Arcs" for the function which draws a line which is tangent to two arcs; a vertical-line icon and the abbreviation: "Vert" for the function which draws a vertical line; a random-line icon and the word: "Sketch" for the function which draws a free-hand sketched line; an octagonal icon and the abbreviation: "N-Gon" for the function which draws a polygon of variable numbers of sides; a perpendicular-line icon and the abbreviation: "PerPend" for the function which draws a line which is perpendicular to another line; two lines at an acute angle for an icon and the word: "Angle" for a function which draws a line at an angle to another line; the letters W×H within a rectangle as an icon and the abbreviation: "RecH&W: for the function which draws a rectangle of a specified height and width.

The Create function with its first sub-level of selectable subfunctions for the particular example is set out in the following table:

TABLE 1

| | | | | CREATE | | | | |
|---|---|---|---|---|---|---|---|---|
| LINE | ARC | CIRCLE | POINT | POLYLIN | FILLET | CHAMBER | POLYGON | SPLINE |

The Line subfunction has the sub-level of selectable functions which is shown in the following table:

TABLE 2

| | | LINE | | | | |
|---|---|---|---|---|---|---|
| ENDPOINTS | PAR/PND | STRING | TANGENT | HRZ/VRT | ANGLE | RECTANGLE |

A number of these sub-functions in the above sub-level also have sub-levels of selectable functions. As an illustration, the Parallel and Perpendicular function has a sub-level of subfunctions of parallel and perpendicular line construction.

The template also has a working area 94 which is reserved as a working area for function definition using the pointing device 20. The pointing device 20 can be moved about within area 94 and its movements within the area will be reflected by movements of the cursor 38 on the screen 32.

At the lower right corner 96 of the templates 42 and 80 of the invention is an area 98 which is reserved for the calculator function which can be present in some operating software. The calculator is selectable with a calculator rectangle 100 and includes a standard numerical pad with calculator functions as well as the standard array 102 of function keys of the computer keyboard which can be used to select various calculator functions.

In instances where an ultimate working function can be selected directly from only a single sub-level of functions, the template illustration of subfunctions can be confined to a single column such as the DELETE column 104. This column 104 includes the items of All Displayed, Level, Plane, Group, Window, Chain, and Single, for the specific deletion functions.

A similar row arrangement of selectable functions appears at the bottom center 106 of the templates in which various view of an object can be selected with a single movement such as Top view, Front view, Back view, Bottom view, Right view, Left view, Isometric view and Axonometric view.

Figure 4:
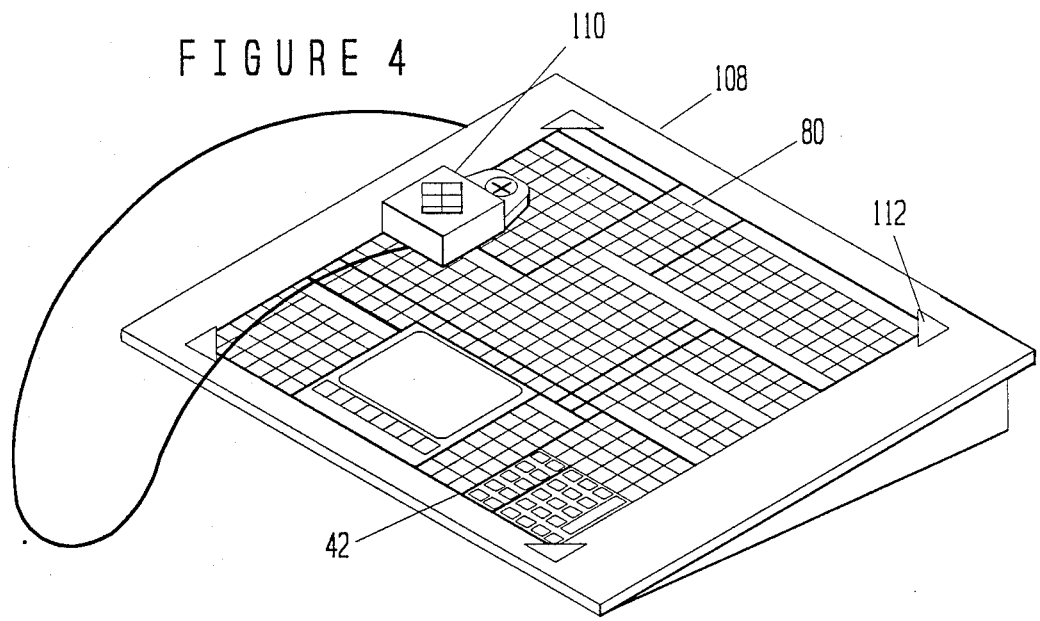
FIG. 4 illustrates the templates of the invention mounted on a digitizing tablet.

Referring now to FIG. 4, the templates are shown mounted on a typical digitizing tablet 108. In this application, the digitizing tablet 108 is provided with a pen 110 as the input device. The overlays 42 and 80 are placed at a preselected orientation on the digitizing tablet and the digitizing tablet is calibrated to the orientation of the overlays. For this purpose, adhesive tabs 112 can be placed over the corners of the overlays, thereby fixedly securing the templates to the digitizing tablet and preventing their movement.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a computer system including a central processing unit having a keyboard entry station with a plurality of keys for data entry and a pointing device station having a pointer with at least one pointer button for data entry and responsive to positionable movement of said pointer, and including system operating functions having successive layers of a main menu of selectable group functions and a plurality of sub-levels of sub-menus having selectable group sub-functions, accessible by successive entries on said keyboard or said pointer to select an ultimate working function, the improvement comprising:
   a. a template for use with said pointing device;
   b. indicia arranged on the template and located in a plurality of groups, one group of each corresponding to one predetermined, selectable item of said main menu and all said indica in a respective group bearing a common group identifying characteristic;
   c. at least a second plurality of indicia, each of which corresponds to a predetermined selectable item of a sub-menu corresponding to an item of said main menu;
   d. means securing said templates in a fixed orientation to said tablet whereby said pointing device can select a working function with a single movement of the said button.

2. The system of claim 1 wherein said pointing station includes a digitizing tablet having a working surface criss-crossed by a gridwork of sensing antenna oriented within said tablet and said pointing device coacts therewith to transmit a signal upon activation of said pointing device button to the antenna immediately adjacent said pointing device, and wherein said templates are positioned on said working surface at a predetermined orientation thereon.

3. The system of claim 2 wherein said template includes a transparent overlay.

4. The system of claim 2 wherein said group-identifying indicia include colors, each of which is preselected for a respective one of said items of said main menu.

5. The system of claim 4 wherein said identifying indica of said selectable sub-functions include icons, each of which is preselected for a respective one of said sub-functions.

6. The system of claim 5 wherein said selectable sub-functions also include word indicia, each of which is preselected for a respective one of said sub-functions.

7. The system of claim 1 wherein said system includes successive series of main menu, a first layer of sub-menus, and at least a second sub-layer of sub-menus.

8. The system of claim 7 including at least a third sub-layer of sub-menus.

9. The system of claim 5 having at lease two templates, one imprinted with said icon indicia and the other being printed with color as said group identifying indica.

10. The system of claim 1 having at least two templates, one imprinted with said icon indica and the other being printed with said color indica.

11. The system of claim 10 wherein the uppermost template is transparent and is imprinted on its undersurface.

12. The system of claim 11 wherein said group-identifying indica include colors, each of which is preselected for a respective one of said items of said main menu, and is printed on the lowermost of said templates.

* * * * *

REEXAMINATION CERTIFICATE (3393rd)
United States Patent [19]
[11] B1 4,933,514

Bowers

[45] Certificate Issued Dec. 9, 1997

[54] INTERACTIVE TEMPLATE

[76] Inventor: Harold L. Bowers, Rte. 3, Box 276, Troutville, Va. 24175

Reexamination Request:
No. 90/002,954, Feb. 1, 1993

Reexamination Certificate for:
Patent No.: 4,933,514
Issued: Jun. 12, 1990
Appl. No.: 315,860
Filed: Feb. 27, 1989

[51] Int. Cl.⁶ ................................................. G08C 21/00
[52] U.S. Cl. ........................... 178/18; 345/160; 345/163
[58] Field of Search ..................... 178/18, 19; 340/709, 340/710, 711, 712, 706; 341/23, 28; 345/168, 169, 172, 173, 179, 174, 160, 163

[56] References Cited

U.S. PATENT DOCUMENTS

| | | | |
|---|---|---|---|
| 4,916,740 | 4/1990 | Node et al. | 178/18 X |
| 5,010,323 | 4/1991 | Hoffman | 340/712 X |

OTHER PUBLICATIONS

Keymaster by Autoease Brocure, Copyright 1987, Autoease Inc.

Free Autoease Mastertemplate Brocure, Copyright 1986 Autoease Inc.
Keymaster by Autoease Brochure, 1988.

*Primary Examiner*—Curtis Kuntz

[57] ABSTRACT

There is disclosed a grouping of templates which are useful in a computer system having a central processing unit with a keyboard station and a pointing device station having a pointer which has at least one cursor button which is responsive to input the positional movement of the pointer. The invention is applicable to computers operating with systems which have successively layers of a main menu of selected and grouped functions and sub-menus in successive layers, which have selected and grouped sub-functions that are accessible by successive entries from the keyboard or the pointing device. The invention is particularly applicable to a computerized assisted drafting or manufacturing system which customarily utilizes a digitizing tablet. The templates of this invention are intended for use with the pointing device and include indicia which are arrayed in predetermined locations on the templates in a plurality of groups, each of which corresponds to a predetermined selectable item of the main menu. All members of a group share a common group identifying characteristic, such as color. The templates include at least a second plurality of indicia, each of which corresponds to a predetermined selectable item of a sub-menu. The invention also includes macro definitions with each macro corresponding to the position coordinates of its identifying indicia on the templates.

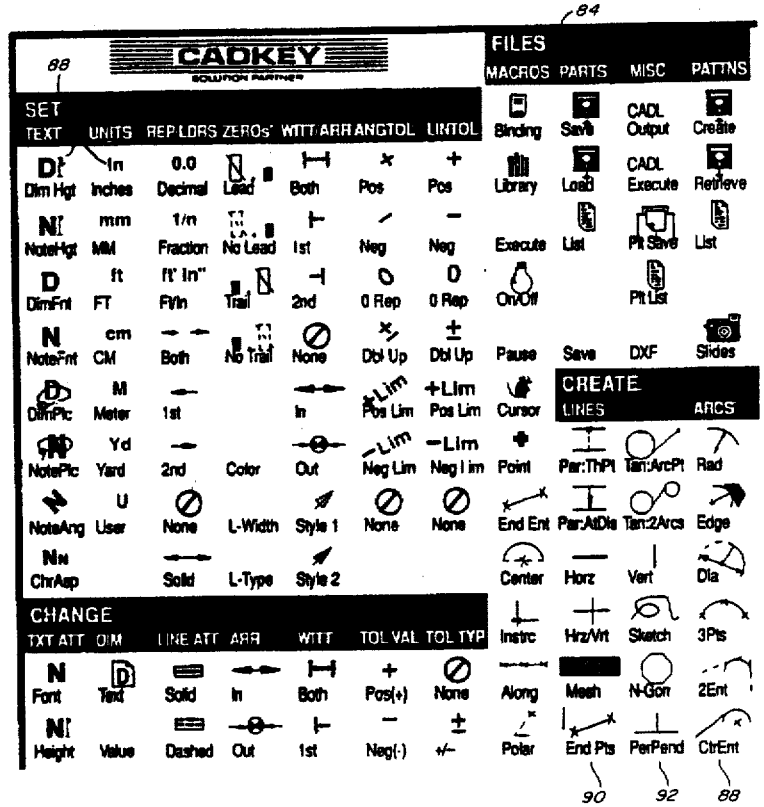

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1 and 8 are determined to be patentable as amended.

Claims 2–6 and 9–12, dependent on an amended claim, are determined to be patentable.

New claim 13 is added and determined to be patentable.

1. In a computer system including a central processing unit having a keyboard entry station with a plurality of keys for data entry and a pointing device station having a pointer with at least one pointer button for data entry and responsive to positionable movement of said pointer, and including system operating functions having successive layers of a main menu of selectable group functions and [a plurality of sub-levels of sub-menus] *successive series of a first layer of sub-menus, and at least a second sub-layer of sub-menus* having selectable group sub-functions, accessible by successive entries on said keyboard or said pointer to select an ultimate working function, the improvement comprising:

a. a template for use with said pointing device;

b. indicia arranged on the template and located in a plurality of groups, one group of each corresponding to one predetermined, selectable item of said main menu and all said indica in a respective group bearing a common group identifying characteristic;

c. at least a second plurality of indicia, each of which corresponds to a predetermined selectable item of a sub-menu corresponding to an item of said main menu;

d. means securing said templates in a fixed orientation to said tablet whereby said pointing device can select a working function with a single movement of the said button.

8. The system of claim [1] *7* including at least a third sub-layer of sub-menus *and said template has a indicia corresponding to a predetermined selectable item of said third sub-layer of sub-menus.*

*13. The system of claim 1 wherein each of said second plurality of indicia corresponds to a predetermined selectable item of said first sub-layer of sub-menus, and including at least a third plurality of indicia, each of which corresponds to a predetermined selectable item of said second sub-layer of sub-menus.*

* * * * *